United States Patent [19]

Kuroda et al.

[11] Patent Number: 5,699,149
[45] Date of Patent: Dec. 16, 1997

[54] DISTANCE MEASUREMENT APPARATUS FOR VEHICLE

[75] Inventors: Hiroshi Kuroda; Atsushi Kanke; Masahiro Komachiya, all of Hitachi; Junichi Ishii, Hitachinaka, all of Japan

[73] Assignee: Hitachi, Ltd., Japan

[21] Appl. No.: 489,293

[22] Filed: Jun. 9, 1995

[30] Foreign Application Priority Data

Jun. 9, 1994 [JP] Japan ................... 6-127294

[51] Int. Cl.⁶ .................. G01C 3/08; H04N 7/18
[52] U.S. Cl. .................. 356/4.01; 348/135
[58] Field of Search .................. 356/3.01, 3.06, 356/4.01, 5.01, 9; 348/135

[56] References Cited

U.S. PATENT DOCUMENTS 4,453,083  6/1984  Bohländer et al. .............. 250/561
5,386,285  1/1995  Asayama ........................ 356/1
5,475,494  12/1995  Nishida et al. ................. 356/4.01

FOREIGN PATENT DOCUMENTS

61-6349    2/1986  Japan.
4-262500   9/1992  Japan.

Primary Examiner—Mark Hellner
Attorney, Agent, or Firm—Evenson, McKeown, Edwards & Lenahan, P.L.L.C.

[57] ABSTRACT

The distance to a target object is measured by capturing the image in front of the driving vehicle using an image sensor, identifying a target object such as a vehicle ahead to which the distance is to be measured, and projecting a laser beam onto the target object. The distance to the target object is measured by angular surveying, using an image sensor for capturing an image as a laser light detection unit.

12 Claims, 14 Drawing Sheets

DISTANCE MEASUREMENT APPARATUS FOR VEHICLE

BACKGROUND OF THE INVENTION

The present invention relates to a distance measurement apparatus for vehicle, specifically to an apparatus for measuring the distance between the driving vehicle itself and the target object by using an imaging apparatus such as an image sensor and a radar.

Conventionally, there has been developed a system for navigating a driving vehicle so that the distance to the obstacle objects around it may be kept in a designate value and/or that the collision to the obstacle objects, both by means of measuring the distance to the obstacle object, for example, a vehicle running in front of the driving vehicle. In such a vehicle navigation system, it is an important goal to establish how accurately the distance to the target object is measured in various field conditions. In order to solve this problem, in the prior art such as Japanese Laid-Open Patent Application No. 4-262500 (1992), what is disclosed is an apparatus measuring the distance to the target object with a couple of image sensors being arrange so as to be apart from each other in a designated base-line distance by triangular surveying. In Japanese Patent Publication No. 61-006349 (1986), what is disclosed is a radar apparatus measuring the distance to the target object and its change rate, that is, relative velocity, by measuring the time difference between the signal emission and the reflected signal receiving by using laser light or electric wave.

However, in case of the method for measuring the distance to the target object by triangular surveying with a couple of image sensors, it is difficult to extract the stable image of the target object from the output signal from the image sensor when the lighting environment changes too much due to the weather changes, the time slot in day or night and the driving way condition such as in tunnel. Therefore, there is a problem that the accuracy of the measurement of the distance to the target object deteriorates. On the other hand, in case of the method of measuring the distance to the target object by measuring the time difference by using light or electric wave, if there exist reflective obstacle such as other vehicles running beside or around than the target objects, there is a problem that it is difficult to distinguish which reflected beams can be used for the measurement of the exact distance to the target object.

SUMMARY OF THE INVENTION

An object of the present invention is to provide a distance measurement apparatus for vehicle which enables a highly accurate measurement of the distance to the target object such as a vehicle running forward even in the driving way condition changing every moment, and furthermore that enables the measurement of the exact distance to the target object so as to be distinguished among the obstacle objects.

The above object can be established by the distance measurement apparatus for vehicle having the following means;

a means for measuring the distance to the target object by capturing the image projected in front of the vehicle on which imaging apparatus such as image sensor and extracting the target object from the image information to which the distance is to be measured, and by exposing a laser light focused in a narrow range in the direction to the target object;

a means for measuring the distance to the target object by angular surveying by receiving the reflected beam from the target object by the imaging apparatus;

a means for determining the target object to which the distance is to be measured by exposing laser beam in a wide range and receiving the reflected light by the imaging apparatus, and for measuring the distance to the target object by exposing a collimated laser beam in a narrow range so as to be directed to the target object; and a means for displaying the image captured by the imaging apparatus to the driver of the vehicle and allowing the driver to specify the target object to which the distance is to be measured, and for measuring the distance by exposing the laser beam to the target object.

In order to determine the target object to which the distance is to be measured according to the image information captured by the imaging apparatus and to measure the distance to the target object by exposing a collimated laser beam in a narrow range to the target object, the distance measurement apparatus for vehicle can reject the laser beam reflected by the obstacle objects, distinguish the target object from the obstacle objects and measure the exact distance to the target object accurately.

DESCRIPTION OF THE PREFERRED EMBODIMENT

By referring to FIGS. 1 to 16, embodiments of the present invention are described below.

Figure 1:
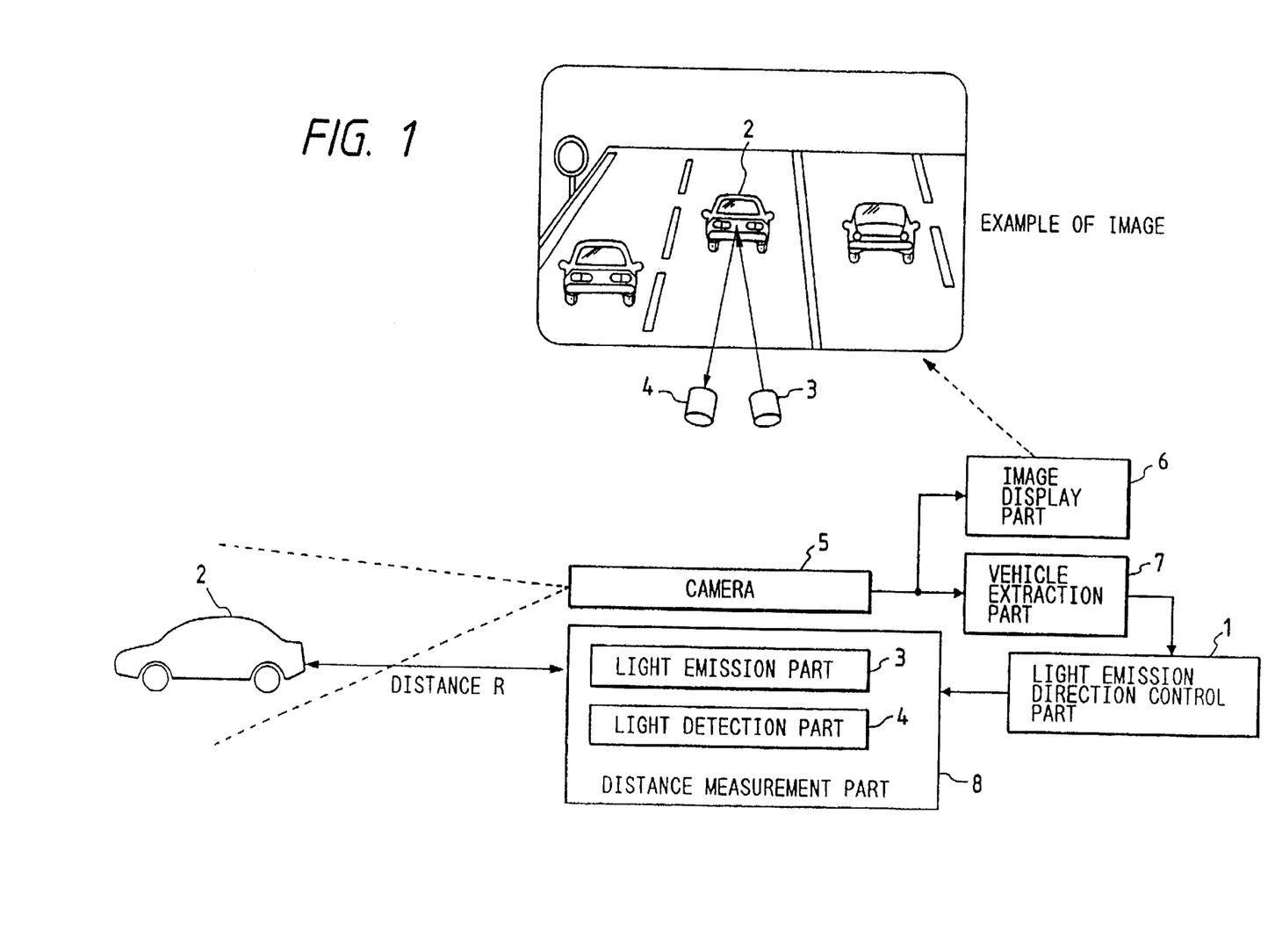
FIG. 1 is a structure of one embodiment of the distance measurement apparatus for vehicle.
Figure 2:
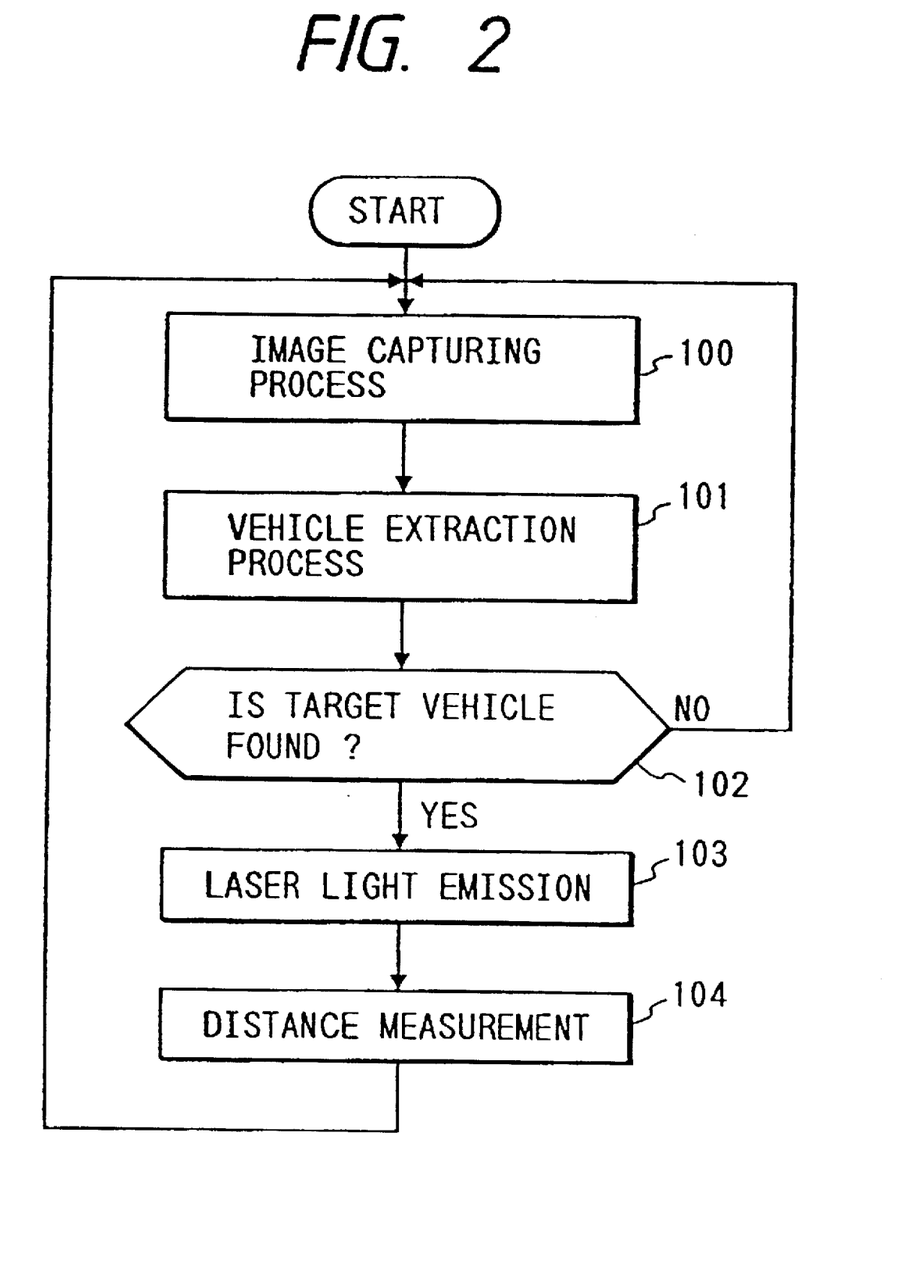
FIG. 2 is a flowchart of procedures in the embodiment shown FIG. 1.

FIG. 1 shows a structure of the apparatus of the present invention, and its procedural flow is shown in FIG. 2. In FIG. 1, the camera 5 used as an imaging apparatus captures the image developed in front of the driving vehicle on which the camera is installed, and the vehicle extraction part 7 extracts the image of the target vehicle 2 running forward in front of the driving vehicle. In responsive to the signal from the light emission direction control part 7, the light emission part 3 exposes a collimated laser beam to the extracted target object. The reflected light from the target vehicle 2 is detected by the light detection part 4, and the distance R from the driving vehicle to the target vehicle 2 is measured. In FIG. 1, an exemplary image is shown on the image display part 6. What shown in this example is that a collimated laser beam is exposed from the light emission part 3 to the target vehicle 2 in the display image and that the reflected light is detected by the light detection part 4. In FIG. 2, the procedures taken in the distance measurement apparatus for vehicle defined as in FIG. 1 are shown in a flowchart. At first, in the step 100, the image developed in front of the driving vehicle is captured by the camera 5. In the step 101, the image of the target vehicle as an object to which the distance is to be measured is extracted by the vehicle extraction part 7. If it is judged in the step 102 that the target vehicle does not exist, the step 100 is selected to go back for capturing the next image. If the target vehicle exists, a collimated laser beam is exposed to the target vehicle in the step 103, and next, the distance to the target vehicle is measured by detecting the reflected light in the step 104. After measuring the distance, going back to the step 100 and the above procedures are repeated again. Though what is shown in this embodiment is an example using laser beam for measuring the distance to the target vehicle, it may be allowed to use another kind of emission beams or collimated electric waves.

Figure 3:
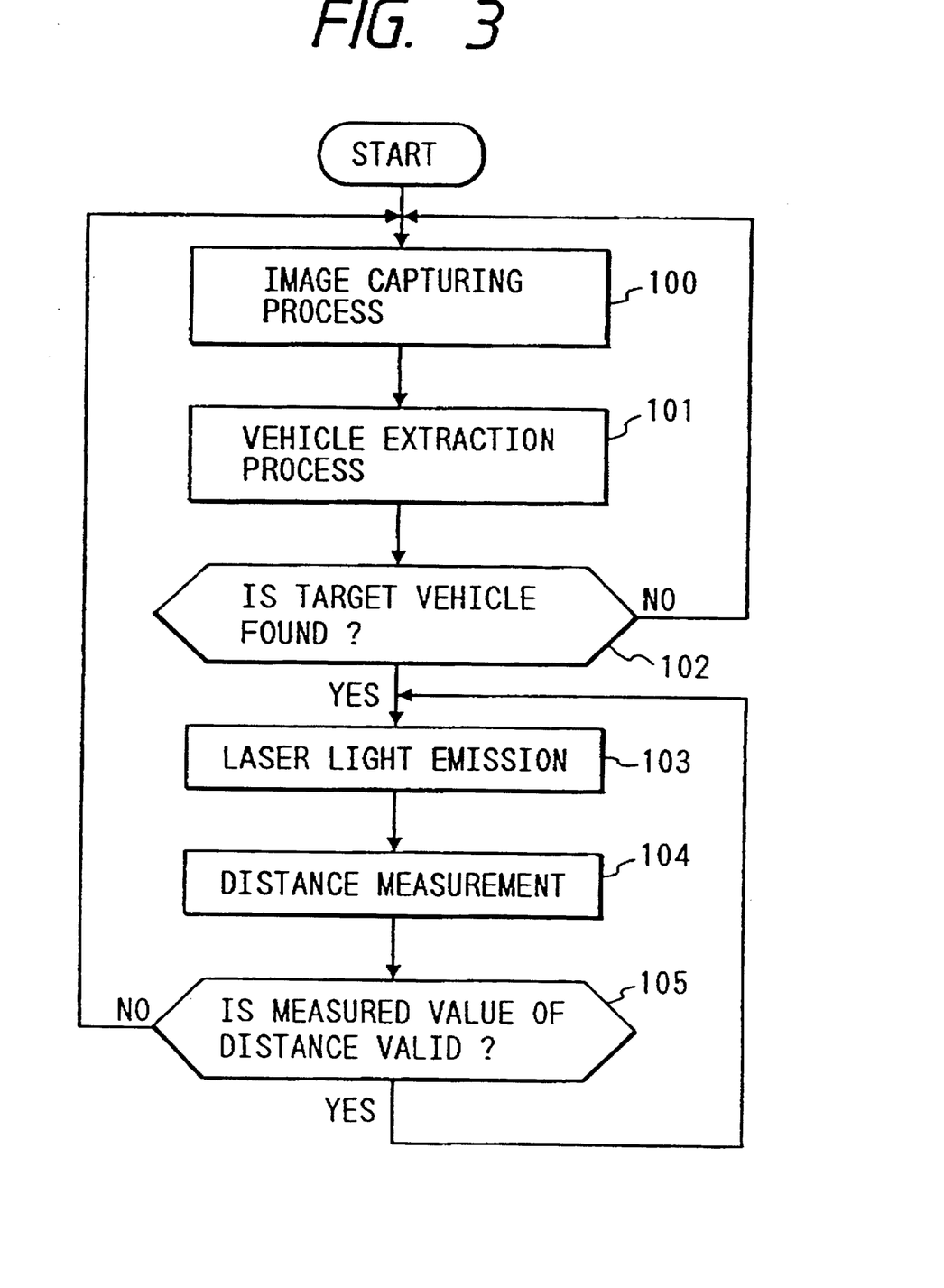
FIG. 3 is a flowchart of procedures in the embodiment shown FIG. 1.

By referring to FIG. 3, another procedures applicable to the apparatus structure identical to that in FIG. 1 are described. The procedures down to the step 102 are common to those in FIG. 2. After exposing a collimated laser beam to the target vehicle in the step 103, the distance to the target vehicle is measured in the step 104. As it is possible to suppose that the distance between the driving vehicle and the vehicle running forward and its time change is limited to a definite value, it can be judged comprehensively in the step 105 whether the measured value of the distance is valid or not. If it is so, the laser beam is judged to be exposed properly to the target vehicle, and therefore, the procedures from the step 103 to the step 105 are repeated. In case that the step 105 judges that the measured value is not valid and that the laser beam is not exposed to the target vehicle, going back to the step 100, the procedures from the step 100 for capturing the image to the step 103 for exposing the laser beam are repeated.

Figure 4:
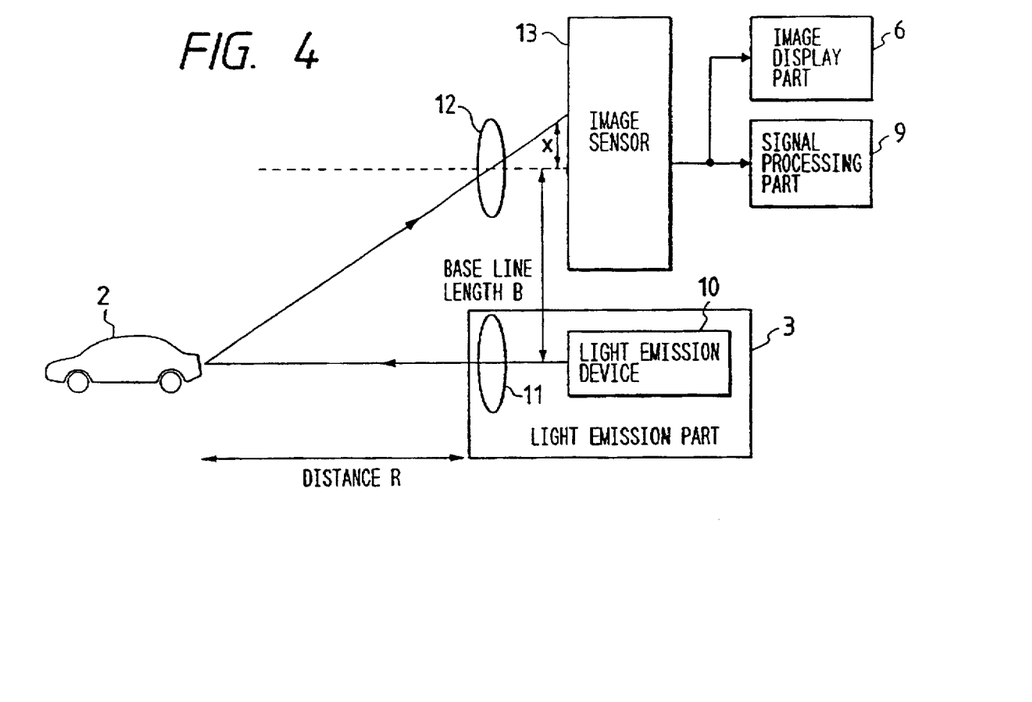
FIG. 4 is a schematic diagram showing distance measurement method for vehicle.

By referring to FIG. 4, another embodiment is described below. Similarly to the embodiment shown in FIGS. 1 and 2, the image developed in front of the driving vehicle is captured by the image sensor 13 in the camera 5, and the image of the target vehicle to which the distance is to be measured is extracted. Next, a laser beam is exposed to the target vehicle 2 from the light emission part 3. The emitted laser beam from the light emission device 10 in the light emission apparatus 3 passes through the emission light system 11. The exposed laser beam is reflected on the target vehicle 2, and goes back through the detection light system 12, and finally develops an image on the image sensor 13. The distance x from the optical center of the detection light system 12 to the image development part on the image sensor is evaluated by the image sensor 13 and its output signal is transferred to the signal processing part 9. The distance R between the driving vehicle and the target vehicle 2 is evaluated by the signal processing part 9 by the following formulae for triangular surveying.

$$R = \frac{B \cdot f}{x}$$

where
R is the distance to the target vehicle,
B is the length of the base-line extended between the emission light system and the detection light system, and
f is the focus length in the light system.

For example, in case of using a CCD camera for the image sensor 13, the pixel pitch of the light detection part of the CCD camera is normally about 15 micro meter, and assuming that the length B of the base-line is 20 cm and the focus length is 5 cm, the distance R to be measured around 50 m can be estimated with about 3 m resolution.

Figure 5:
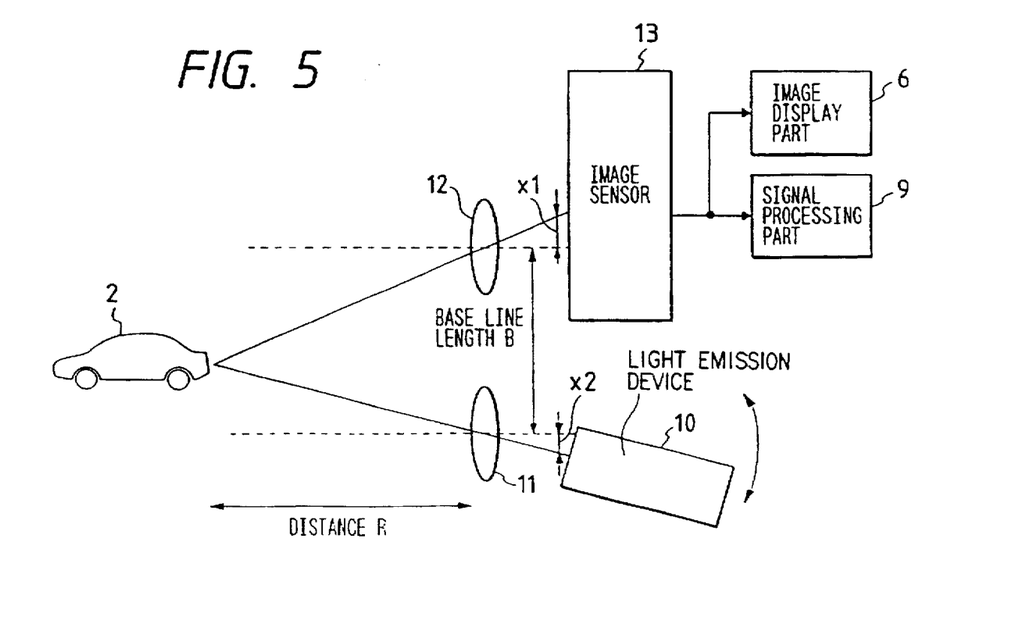
FIG. 5 is a schematic diagram showing distance measurement method for vehicle in another embodiment.

By referring to FIGS. 5 and 6, another embodiment is described below. The components of the distance measurement apparatus for vehicle in FIG. 5 are similar to those shown in FIG. 4 except that the light emission device 10 is movable in FIG. 5 so that the light emission direction may be changed. The light emitted from the light emission device 10 reflected on the target vehicle, and the reflected light passes through the detection light system 12 and develops an image on the image sensor 13. The image sensor 13 estimates the distance x1 between the optical center of the detection light system 12 and the image development part and supplies its output signal to the signal processing part 9. In addition, the distance x2 between the optical center of the emission light system 11 and the light emission device 10 is evaluated. Based on the evaluated value x1 and x2, the distance R between the driving vehicle and the target vehicle 2 is obtained by the following formulae;

$$R = \frac{B \cdot f}{x1 + x2}$$

where
R is the distance to the target vehicle,
B is the length of the base-line extended between the emission light system and the detection light system, and
f is the focus length in the light system.

In the similar manner, not only in case that the light emission device 10 is movable, but also in case that the emission light system 11 is movable, or in case that both of the light emission device 10 and the emission light system 11 are movable, the distance R to the target vehicle can be evaluated.

Figure 6:
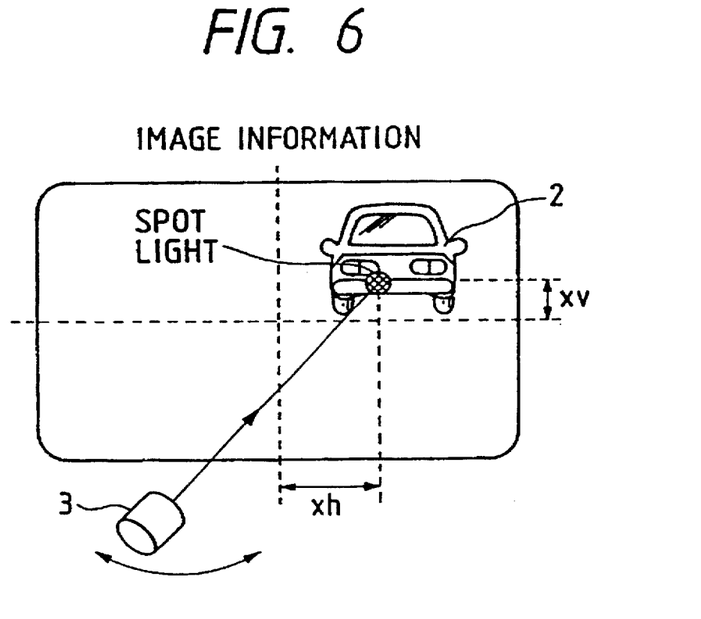
FIG. 6 is a schematic diagram showing distance measurement method for vehicle in another embodiment.

In FIG. 6, an exemplary image captured by the image sensor 13 is shown on the image display part 6. The target vehicle 2 is recognized from the image information, and a collimated laser beam is exposed to the target vehicle 2 from the light emission part 3 including the emission light system 11 and the light emission device 10. The exposed light from the light emission part 3 is recognized as a light slot pattern on the image developed onto the image sensor 13. The center position of the light spot pattern is defined on the image, and the distance between the center position of the detection light system and the center position of the light spot pattern is evaluated as the horizontal displacement Xh and the vertical displacement Xv. By obtaining the root of the sum of the square of Xh and the square of Xv, with angular surveying similar to the formulae 2, the distance to the target vehicle is evaluated.

Figure 7:
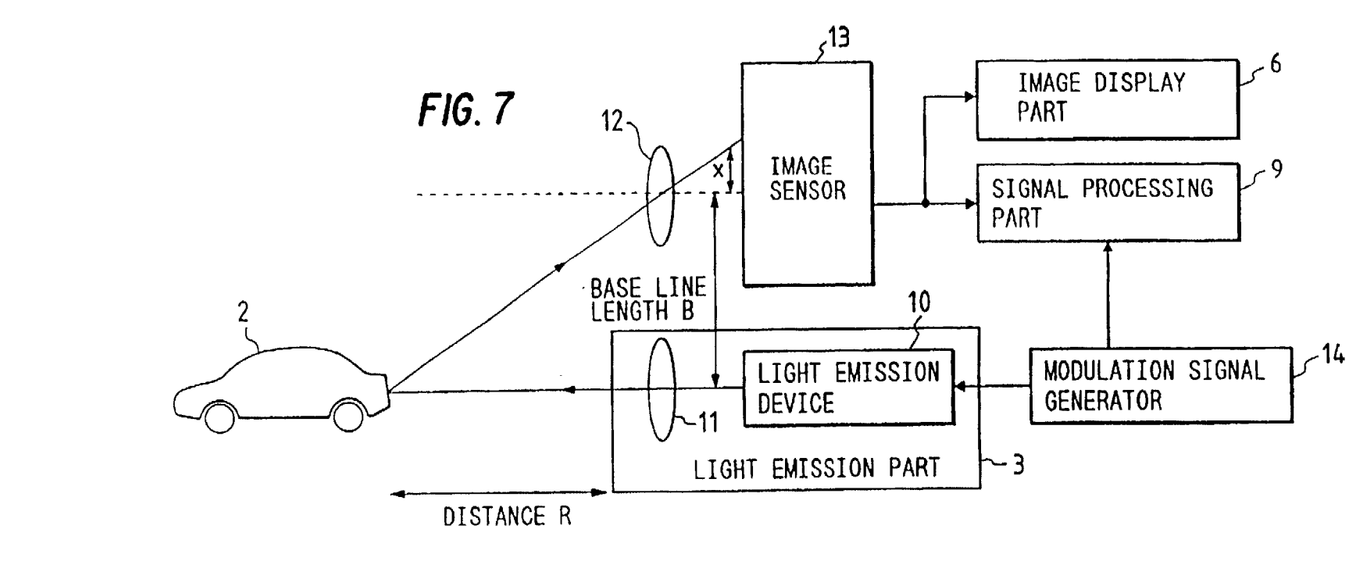
FIG. 7 is a schematic diagram showing distance measurement method for vehicle using modulation signal.
Figure 7A:
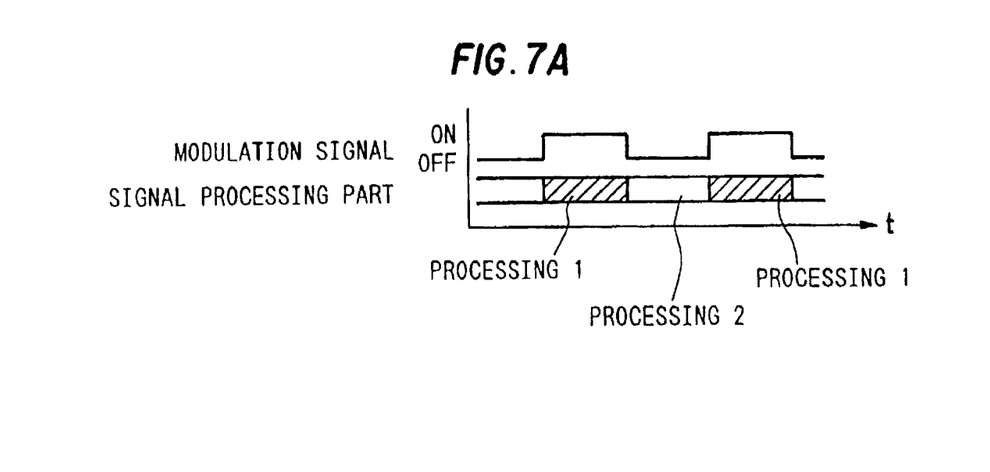

By referring to FIG. 7, another embodiment is described below. In the distance measurement apparatus for vehicle using the light emission device 10 and the image sensor 13 as described in FIGS. 1 and 4, a modulation signal to the light emission device 10 is applied by the modulation signal generator 14, and the signal processing part 9 processes the input signal in responsive to the timing of modulated signals. For example, as shown at the lower left part in FIG. 7, the intensity of the signal supplied by the light emission device 10 is changed by turning on and off the modulation signal in the time series. The image information captured by the image sensor 13 in the time slot while the modulation signal is turned on and the image information captured by the image sensor 13 in the time slot while the modulation signal is turned off are compared and processed by the processes 1 and 2, respectively, in the signal processing part 9. In this way, by discriminating the reflected light from the target vehicle to which the light is emitted from the light emission device 10 from another background light, the distance to the target vehicle 2 is measured.

Figure 8:
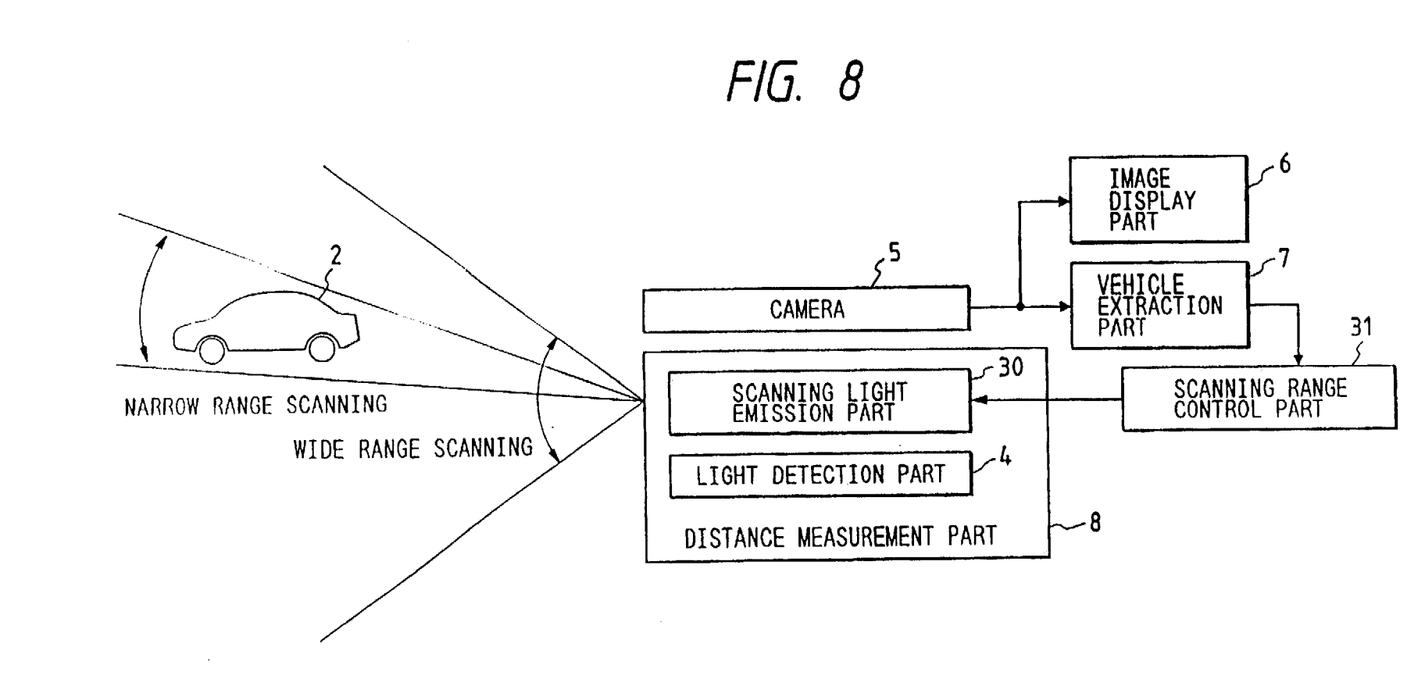
FIG. 8 is a structure of another embodiment of the distance measurement apparatus for vehicle.
Figure 9:
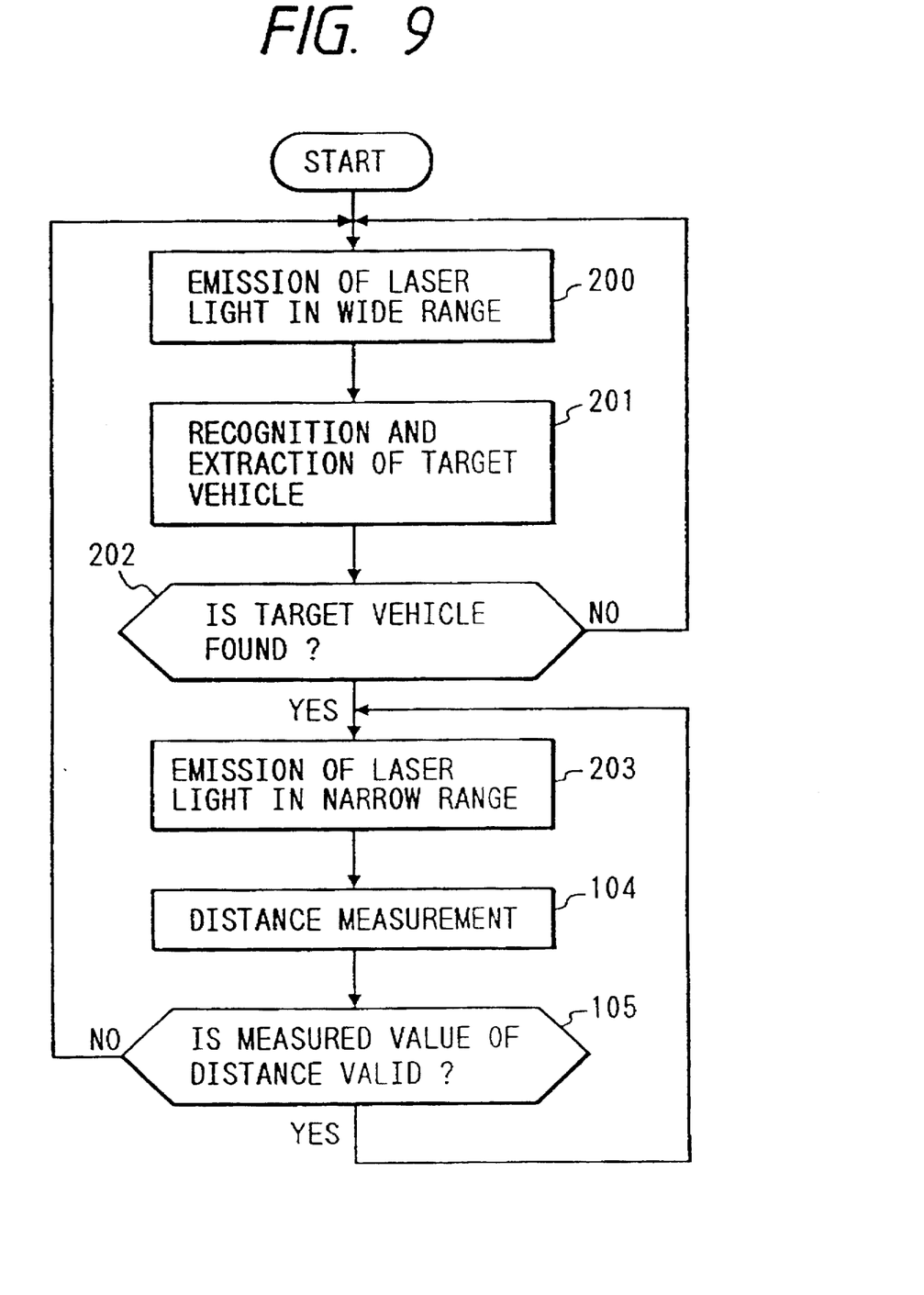
FIG. 9 is a flowchart of procedures in the embodiment shown in FIG. 8.

By referring to FIGS. 8 and 9, another embodiment is described below. This embodiment relates to a distance measurement apparatus for vehicle having a scanning light emission part 30 formed by adding a scanning range control part 31 to the embodiment described in FIG. 1. In case that the direction in which the target vehicle is located in front of the driving vehicle is not exactly forecastable, the scanning range is made to be wide. In this case, by using the light emitted from the scanning light emission part 30, the reflected light is captured by the camera 5, and the existence of the target vehicle 2 is detected by the vehicle extraction part 7. After detecting the existence of the target vehicle 2, the scanning light emission part 30 scans the light in a narrow range within which the target vehicle 2 can be found in responsive to the signal supplied by the scanning range control part 31. For following the movement of the target vehicle, the target vehicle is traced by altering the direction of the narrow-range scanning by extracting the reflected light from the target vehicle 2 by the camera 5 in the vehicle extraction part 7 and supplying the control signal from the scanning range control part 31 to the scanning light emission part 30. The procedures in this embodiment are shown as a flowchart in FIG. 9. At first, in the step 200, a laser beam is exposed in a wide range. The reflected light is captured by the camera 5, and the procedure at the step 201 for recognition and extraction of the target vehicle is performed in the vehicle extraction part 7. The existence of the target vehicle is judged in the step 202, and if the target vehicle does not exist, the step 200 is taken back again. If the target vehicle exists, the light beam is scanned in a narrow range within which the target vehicle is located in the step 203. In the similar manner as described in FIG. 3, the distance is measured in the step 104, and the validation of the measured value of the distance is judged in the step 105. In case that the measured value of the distance is valid, the step 203 is taken again for repeating above procedures. In case that the value is not valid, a series of procedures from the step 200 are performed again.

Figure 10:
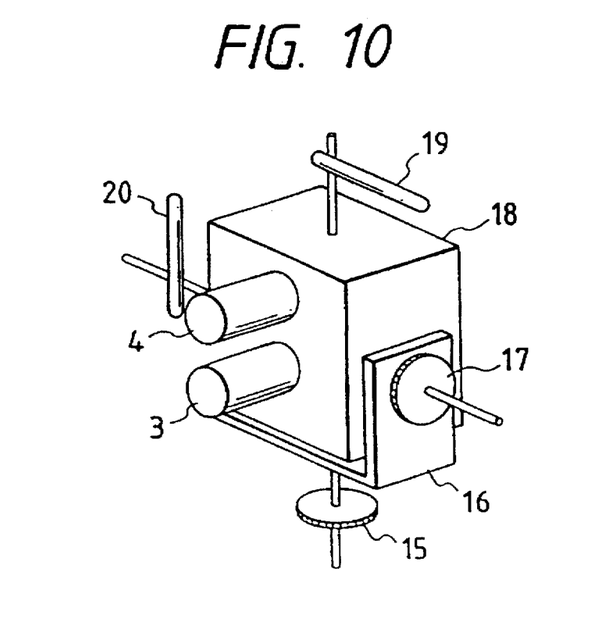
FIG. 10 is a schematic diagram of the distance measurement apparatus for vehicle having a mechanical mechanism for vibration protection.

By referring to FIGS. 10 and 11, another embodiment is described below. In this embodiment, by adding such a function for preventing image-blurring due to the vibration of the driving vehicle as used in handy video cameras to the above described embodiments of the distance measurement apparatus for vehicle, the distance measurement is performed so as to extract a clear image of the target vehicle from the image information. In FIG. 10, a mechanical method for correcting the vibration effect on image-blurring is shown. A unit 18 containing the light emission part 3 and the light detection part 4 is supported by the special support mechanism 16 so as to move freely in the vertical and horizontal directions. In the unit 17, an angle sensor 20 for detecting the intensity of vibrational movement in the vertical direction, an angle sensor 19 for detecting the intensity of vibrational movement in the horizontal direction, an actuator 17 for rotating the unit in the vertical direction and an actuator 15 for rotating the unit in the horizontal direction are mounted. When the vibrational force is applied to the distance measurement apparatus for vehicle having the light emission part and the light detection part, a couple of angle sensors 19 and 20 detects vibrational movement. Using signals from those sensors, the actuators 15 and 17 are operated so that the vibrational movement may be compensated in order to make the emitted light from the light emission part 3 exposed stably and to make the reflected light develop an image on the image detection part stably. In FIG. 10, what is shown as an example is a mechanism including a couple of angle sensors and a couple of actuators for compensating vibrational movement in two directions. However, it may be allowed to use three sets of angle sensors and actuators for compensating vibrational movement in three directions.

Figure 11:
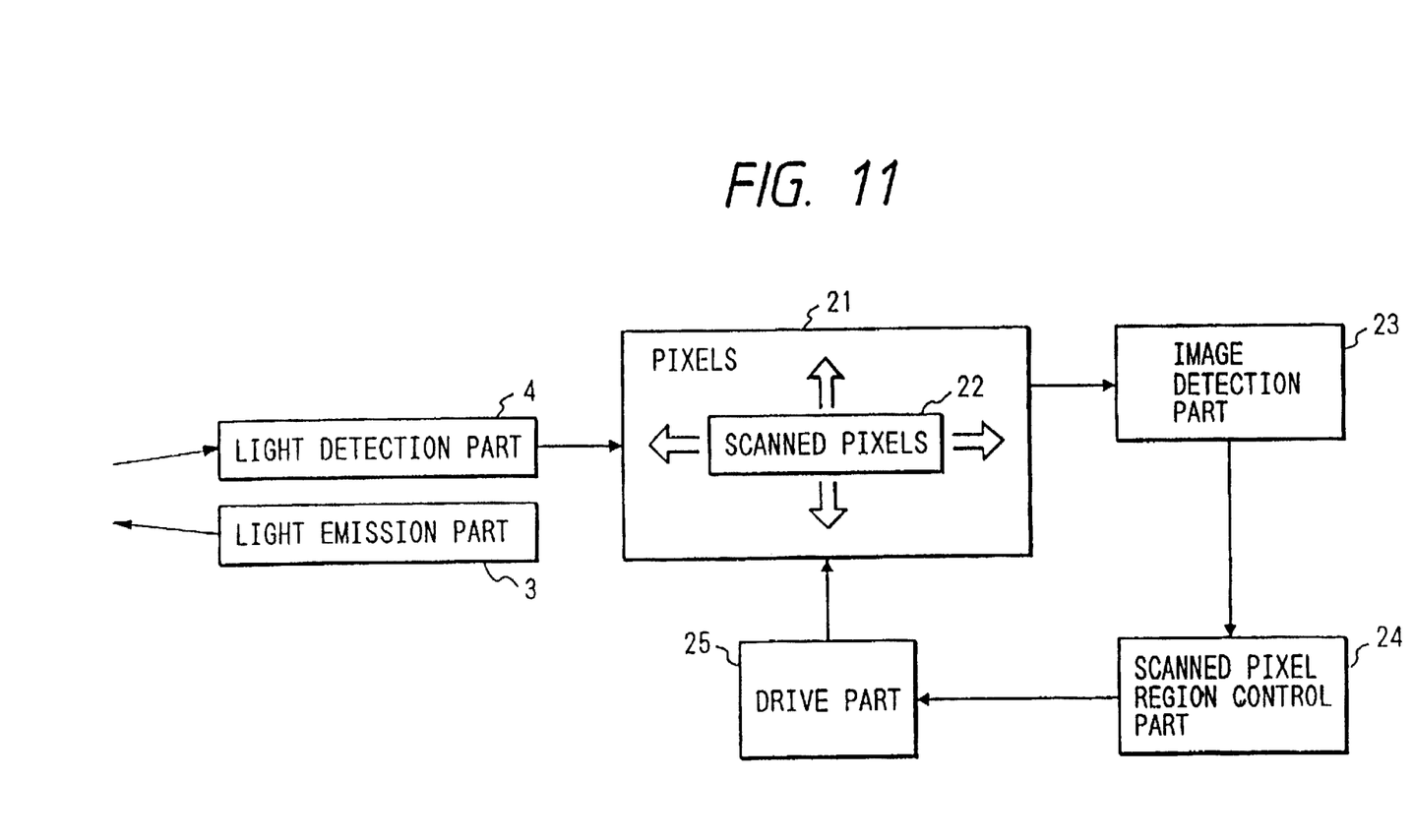
FIG. 11 is a schematic diagram of the distance measurement apparatus for vehicle having an electronic mechanism for vibration protection.

In the embodiment shown in FIG. 11, an electronic method for correcting the vibration effect on image-blurring is shown. Scanned pixels 22 are defined to be pixels in the region which are to be captured by the image sensor of the light detection part 4, and marginal pixels 31 are defined to be pixels around the scanned pixels with its number being set to be half of the number of the scanned pixels. The region of the scanned pixels can be shifted in vertical and horizontal directs in responsive to the control signal from the drive part 25. In the image-blurring detection part 23, the blurring pattern in the image captured by the light detection part 4 is detected, and the control signal for compensating the vibrational movement causing the blurring effect is supplied by the scanned pixel region control part 24 to the drive part 25. In responsive to the drive signal from the drive part 25, the region of the scanned pixels 22 are moved horizontally and vertically so as to obtain a stable image.

Figure 12:
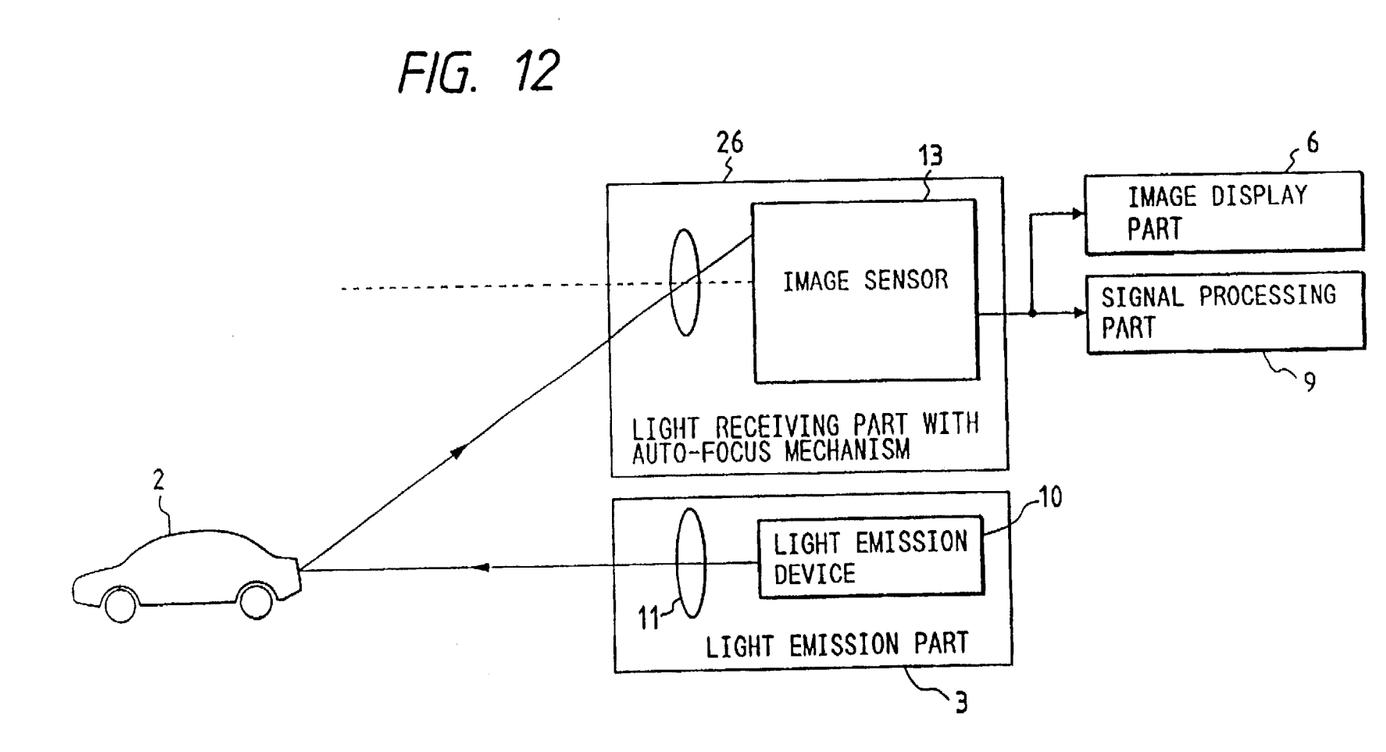
FIG. 12 is a schematic diagram of distance measurement method for vehicle having an auto-focus mechanism.

By referring to FIG. 12, another embodiment is described below. In the apparatus for measuring the distance by emitting the light from the light emission part 3 and detecting the reflected light from the target vehicle by the image sensor 13, the light detection part including the image sensor 13 is formed as a light detection part 26 having an auto-focus mechanism using TTL (Through The Lens). In either case that the distance to the target object 2 is short or long, a sharp image of the target vehicle 2 is developed on the image sensor 13 with the auto-focus mechanism. By adding a zooming function to the light detection part 26 having an auto-focus mechanism, the size of the image of the target vehicle 2 developed on the image sensor 13 is controlled so that the image of the target vehicle 2 may be captured accurately.

Figure 13:
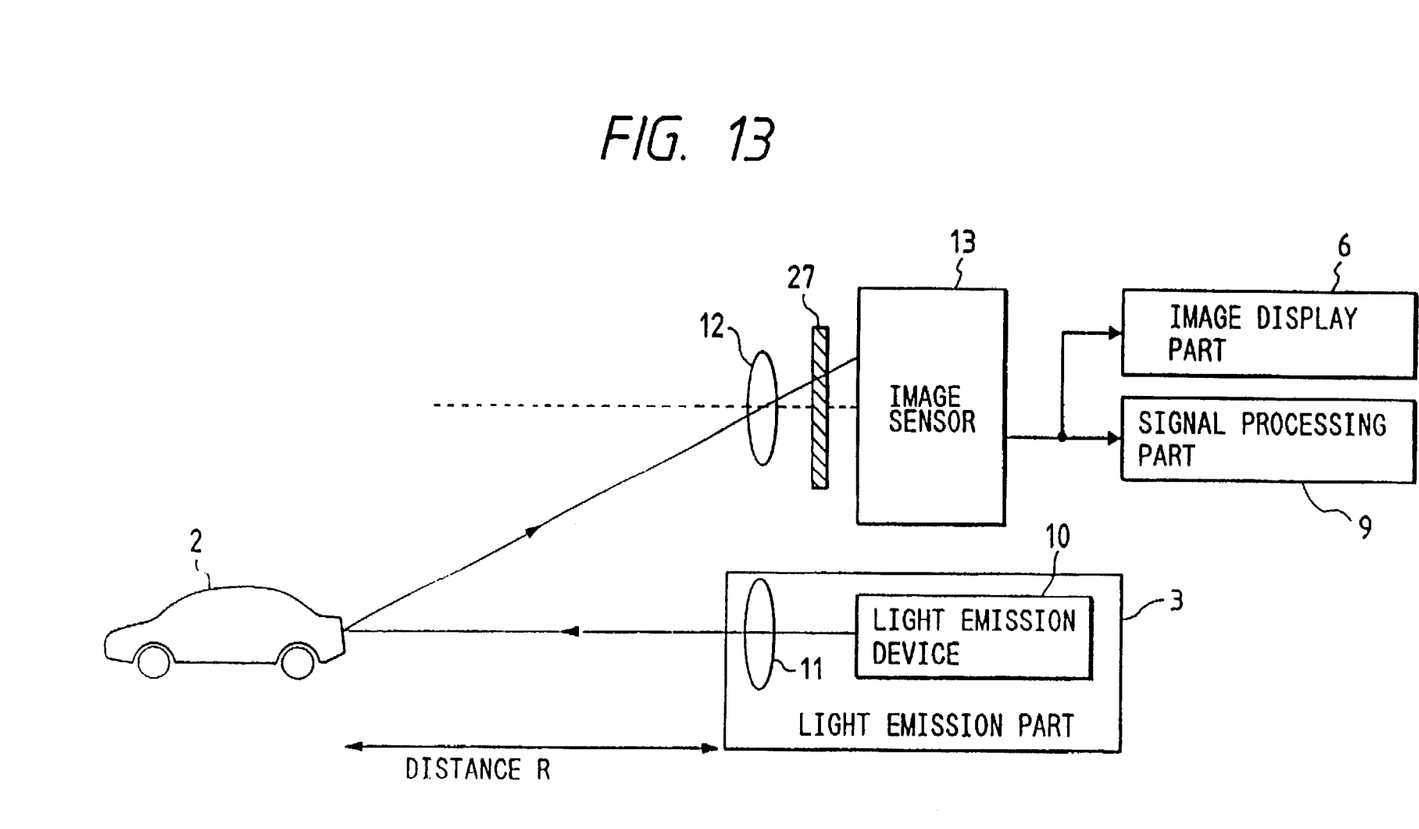
FIG. 13 is a schematic diagram of distance measurement method for vehicle having a light filter in the light receiving part.

By referring to FIG. 13, another embodiment is described. In the distance measurement apparatus for vehicle using the light emission part 3 and the image sensor 13, the light emission device 10 exposing the light having a designated wave length, and a light filter 27 through which the light with the wave length using the light emission device 10 passes well is mounted before the image sensor 13 in the light detection part. In FIG. 13, what is shown as an example is an optical filter 27. Instead of using the optical filter 27, it may be allowed to use an image sensor 13 sensitive to the light having a designated wave length used in the light emission device 10.

Figure 14:
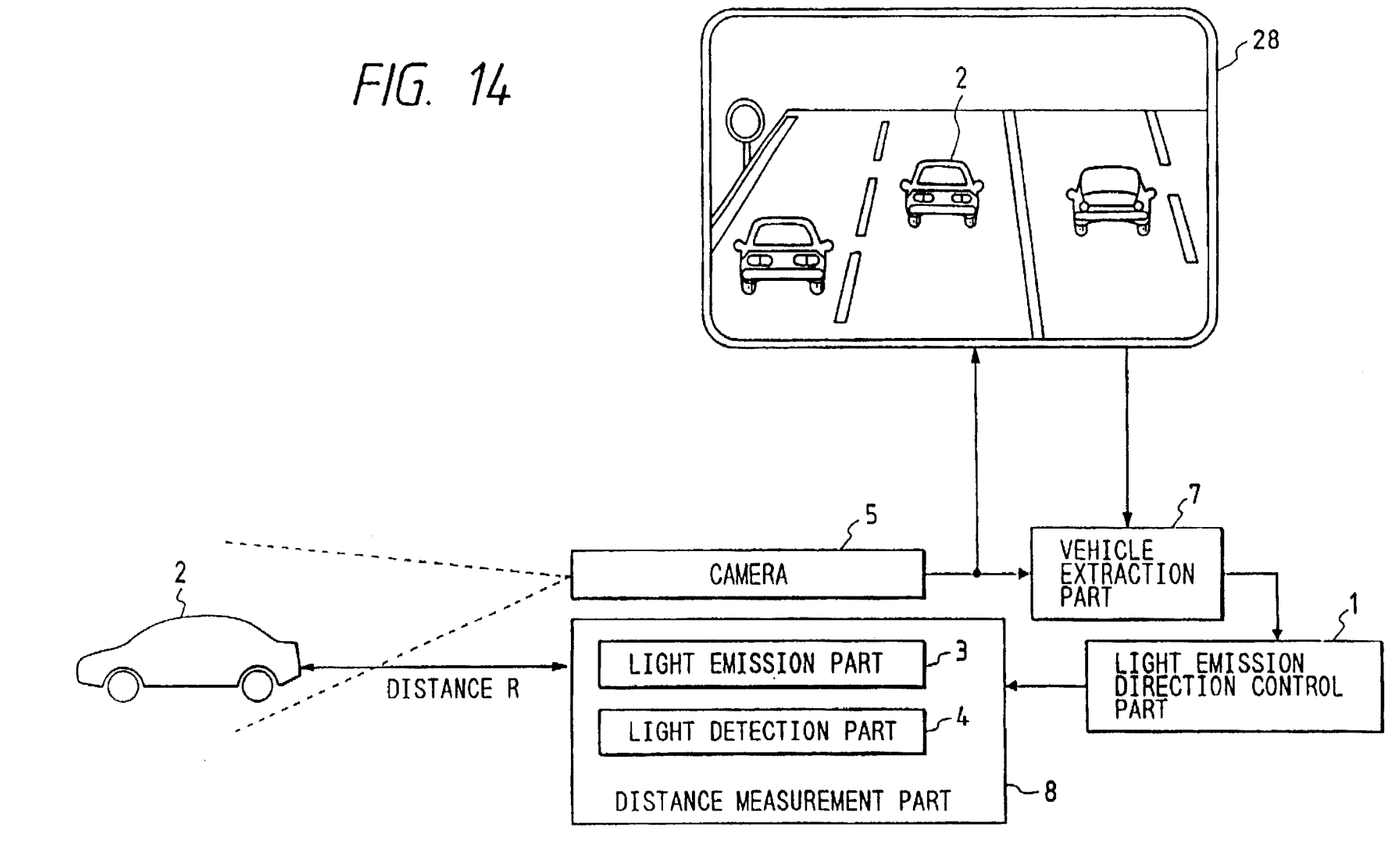
FIG. 14 is a structure of another embodiment of the distance measurement apparatus for vehicle.
Figure 15:
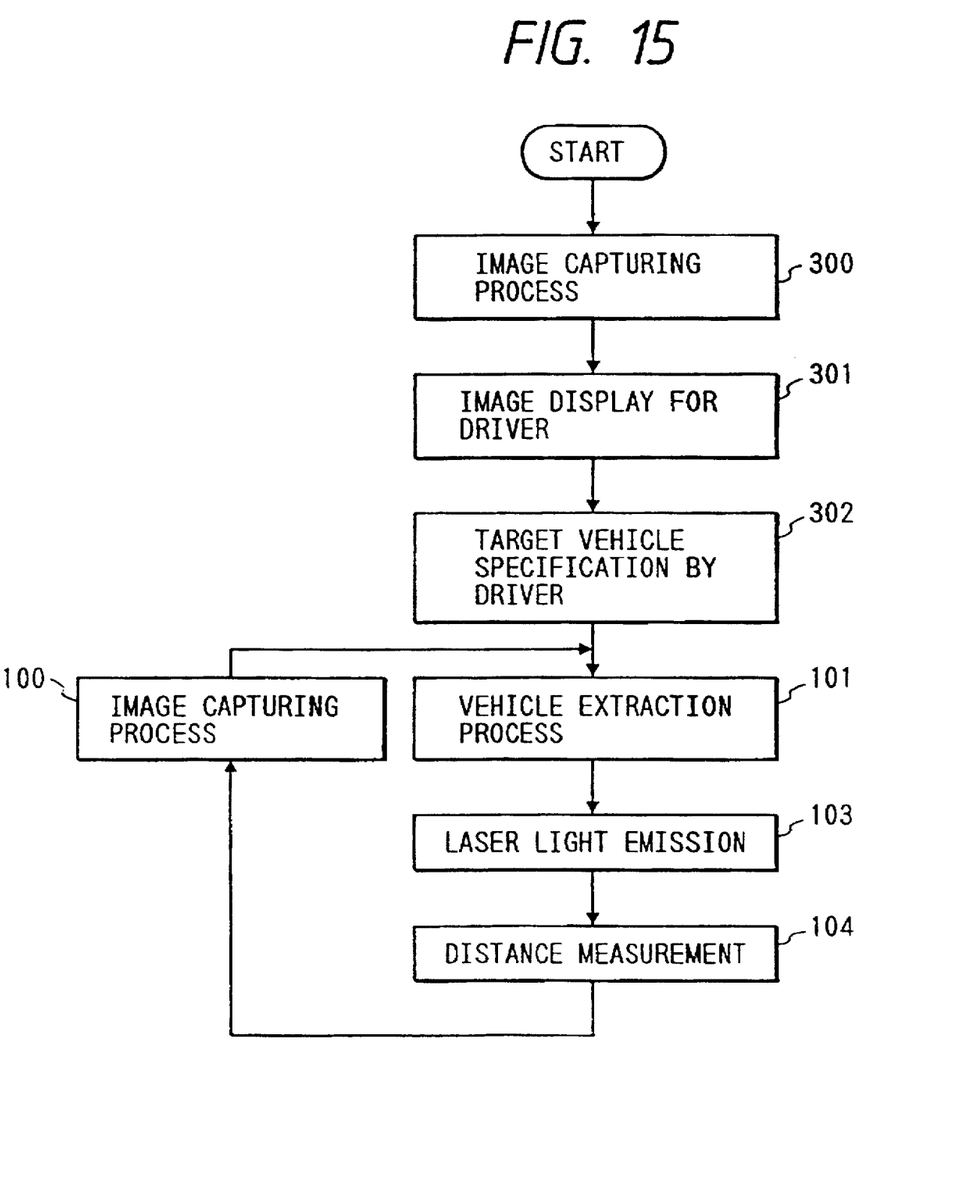
FIG. 15 is a flowchart of procedures in the embodiment shown in FIG. 14.

Referring to FIGS. 14 and 15, another embodiment is described. FIG. 14 shows a structure of the apparatus of the present invention, and its procedural flow is shown in FIG. 15. In the structure in FIG. 14, an image display part 28 having a touch panel is used instead the image display part 26 in the embodiment shown in FIG. 1. Though an example of the image display part having a touch panel is shown in FIG. 14, it may be allowed to use such pointing devices as cursor and mouse for locating a designated position on the display screen. As shown in FIG. 15, at first in the step 300, the image information developed in front of the driving vehicle is captured by the camera 5. Next in the step 301, the image displayed on the image display part with touch panel 28 is presented to the vehicle driver. In the step 302, the driver is allowed to select the target vehicle to which the distance is to be measured. Based on the input signal by the driver on the image display part with touch panel 28, the target vehicle to which the distance is to be measured is extracted in the step 101. In the step 103, a laser beam is emitted to the target vehicle 2, and the distance to the vehicle is measured in the step 104. Now that the target vehicle is specified, the image information is captured by the camera 5 in the step 100, and going back to the step 101, the image of the target vehicle 2 is automatically captured by the vehicle extraction part 7, and the distance measurement is performed in the steps 103 and 104, and thus, a series of the steps 100, 101, 103 and 104 are repeated.

Figure 16:
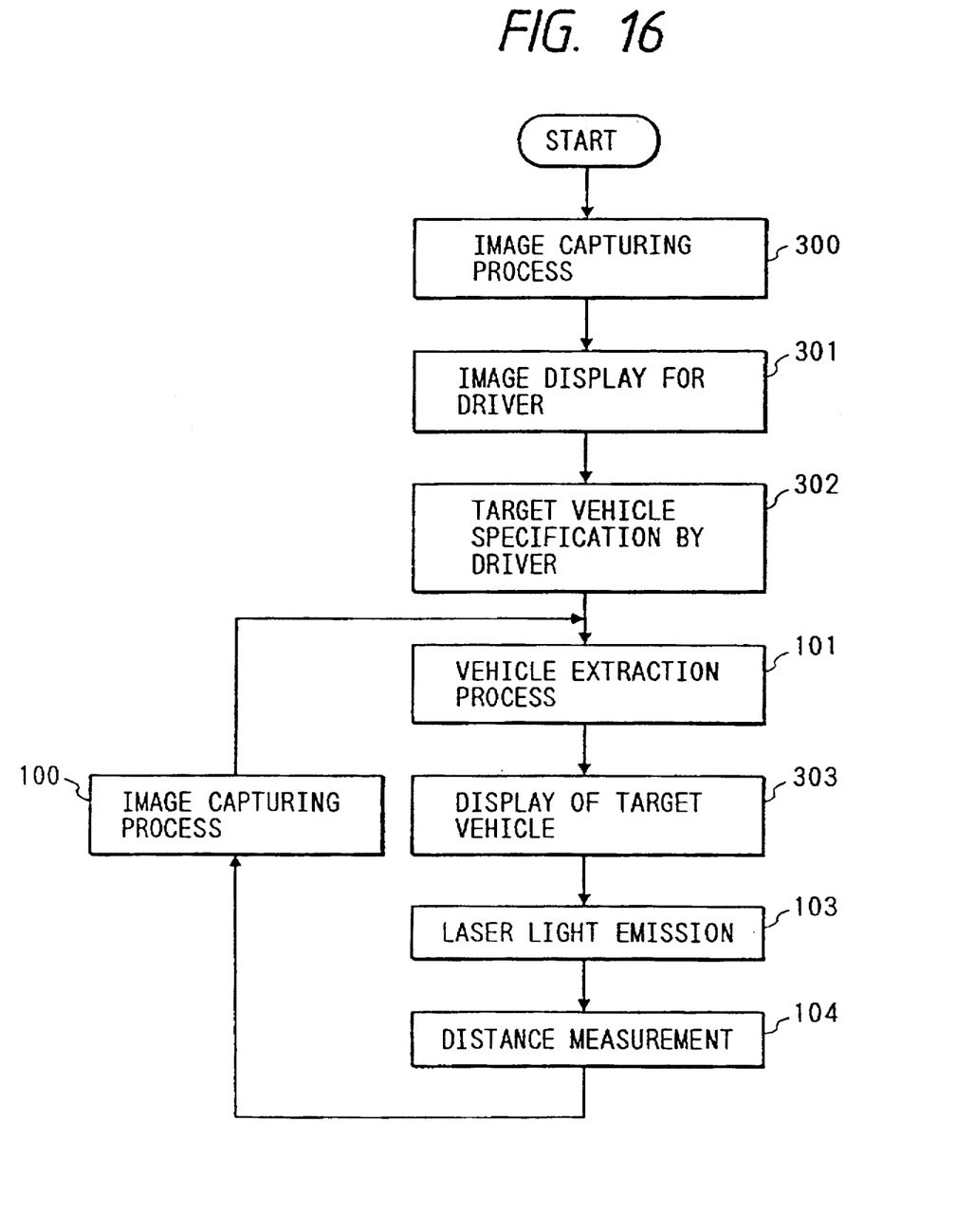
FIG. 16 is a flowchart of procedures in the embodiment shown in FIG. 14.

By referring to FIG. 16, another procedural flow applied to the structure in FIG. 14 is described. In contrast to the flow in FIG. 15, a step 303 is inserted after the step 101 in FIG. 16. After extracting the target vehicle to which the distance is to be measured in the step 101, the target vehicle is presented to the vehicle driver in the step 303 by means that the display color is changed or the outline of the display pattern is accentuated in order to make it easier to distinguish the target vehicle from the background image.

According to the present invention as described above, as the distance to the target vehicle is measured by capturing the image developed in front of the driving vehicle by the image sensor, extracting the target vehicle to which the distance is to be measured, and exposing a laser light collimated toward to target vehicle, it will be appreciated that the target vehicle is recognized exactly and that the distance to the target vehicle can be measured precisely, even in case of co-existence of other obstacle objects around the vehicles.

What is claimed is:

1. A distance measurement apparatus for a vehicle, comprising:

an image capturing apparatus for capturing an image of an area around a driving vehicle;

a signal processing unit for designating in said image a target vehicle to which a distance is to be measured;

a light emission unit for projecting a collimated laser beam onto said target vehicle; and a distance unit for evaluating a distance by detecting a reflected laser beam from said target vehicle.

2. A method for measuring the distance of a target object from a vehicle, comprising:

a first step for selecting a target vehicle;

a second step for projecting a collimated laser beam onto a target vehicle; and a third step for measuring the distance to said target vehicle by detecting a reflected laser beam from said target vehicle and evaluating the validity of a measured value of said distance; wherein if said measured value is valid, said second and third steps are repeated; and otherwise, the first through the third steps are repeated.

3. A distance measuring apparatus for a vehicle, comprising:

an image capturing apparatus for capturing an image of an area around a driving vehicle;

a signal processing unit for designating in said image a target vehicle to which a distance is to be measured;

a light emission apparatus for projecting a collimated laser beam onto said target vehicle;

an image detecting apparatus having a light detection system for capturing light reflected from said target object and forming a target image thereof on said image detecting apparatus;

means for measuring the distance of said target image from a substantial center of said light detection system; and means for measuring the distance to said target vehicle by using information concerning the position of said light emission apparatus, position of said light detection system, and said distance of said target image from said substantial center of said light detector system.

4. A distance measurement apparatus according to claim 3, wherein said light emission apparatus can change freely a direction in which a laser beam is emitted.

5. A distance measurement apparatus according to claim 3, further comprising:

means for changing intensity and phase of a laser beam by applying a designated modulation signal to said light emission apparatus;

means for processing image information captured by said image detecting apparatus in response to said modulation signal; and means for distinguishing a reflected laser beam from background light.

6. A distance measurement apparatus for a vehicle comprising:

a light emission apparatus for emitting a laser beam with a variable emission range;

means for emitting a laser beam from said light emission apparatus in a wide range;

a signal processing part for detecting a reflected laser beam and for designating a target vehicle; and a measurement apparatus for measuring the distance to said target vehicle by projecting a collimated laser beam onto said target vehicle from said light emission apparatus and detecting a reflected laser beam from said target vehicle.

7. A distance measurement apparatus according to claim 3 wherein a unit for emitting and detecting a laser beam has:

a support mechanism;

a sensor for detecting a vibration movement of a driving vehicle; and an actuator for compensating said detected vibration movement.

8. A distance measurement apparatus according to claim 7 further comprising:

means for defining a marginal pixel region around a scanned pixel region in an image sensor of a light detection part, and for allowing said scanned pixel region to be moved freely in vertical and horizontal directions; and an apparatus for detecting an image-blurring effect from image information captured on said scanned pixel region;

wherein a control function is provided for shifting said scanned pixel region on said image sensor so as to compensate a vibration movement causing said image-blurring effect due to a vibration of a driving vehicle.

9. A distance measurement apparatus according to claim 8 further comprising:

a light detection unit having an auto-focus mechanism; and means for focussing an image of a target vehicle on an image sensor.

10. A distance measurement apparatus according to claim 9 wherein said light detection unit further comprises:

an optical filter which passes light having a wave length identical to a light emitted from a light emission unit.

11. A distance measurement apparatus according to claim 10 wherein said image detecting apparatus detects light having a wave length identical to that of light emitted from said light emission apparatus.

12. A distance measurement apparatus for a vehicle, comprising:

a display unit for an image captured by a camera and presented to a vehicle driver; and an input means on said display unit, allowing said vehicle driver to select a target vehicle to which a distance is measured by means of said image captured said camera; wherein said distance to said target vehicle is measured by projecting a collimated laser beam onto said target vehicle selected by said vehicle driver and detecting a reflected light from said target vehicle.

* * * * *